(12) United States Patent
Suzuki et al.

(10) Patent No.: US 6,236,135 B1
(45) Date of Patent: May 22, 2001

(54) TOROIDAL CORE TYPE ACTUATOR WITH PHASE SEPARATOR

(75) Inventors: Yuzuru Suzuki; Sakae Fujitani; Takashi Ishii; Naoyuki Harada, all of Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 09/457,985

(22) Filed: Dec. 9, 1999

(30) Foreign Application Priority Data

Dec. 10, 1998 (JP) .................................................. 10-351874

(51) Int. Cl.[7] ............................. H02K 1/00; H02K 19/00; H02K 1/12
(52) U.S. Cl. ............................. 310/192; 310/254; 310/162
(58) Field of Search ..................................... 310/164, 254, 310/208, 162, 179, 218, 42, 180, 258, 259, 192; 29/598, 596

(56) References Cited

U.S. PATENT DOCUMENTS

| | | | |
|---|---|---|---|
| 4,363,988 | * 12/1982 | Kliman | 310/268 |
| 4,563,606 | * 1/1986 | Fukasawa et al. | 310/208 |
| 5,304,883 | * 4/1994 | Denk | 310/180 |

\* cited by examiner

*Primary Examiner*—Nestor Ramirez
*Assistant Examiner*—Guillermo Perez
(74) *Attorney, Agent, or Firm*—Fay, Sharpe, Fagan, Minnich & McKee, LLP (57) ABSTRACT

To provide a toroidal core type actuator having a stator unit which is increased in winding density, is improved in methods of the terminal handling after winding, the positioning of the stator after winding, and the fixing of the same, and is excellent in working properties. A toroidal core type actuator having a stator and a rotor is provided, the stator having winding applied to a hollow cylindrical core composed of soft magnetic material, the rotor including a permanent magnet having north poles and south poles alternately arranged in total of m along the circumferential direction thereof, the rotor being rotatably arranged in the core of the stator via a minute air gap, wherein m of phase separators composed of non-magnetic material are arranged on the peripheral surface of the hollow cylindrical core so as to be separated from each other by 360°/m and the winding is applied to winding regions separated from each other by the phase separators.

8 Claims, 10 Drawing Sheets

TOROIDAL CORE TYPE ACTUATOR WITH PHASE SEPARATOR

BACKGROUND OF THE INVENTION

1. Field of the Invention

The present invention relates to a structure of a toroidal core type actuator and more particularly the stator structure of the toroidal core type actuator which facilitates winding and mounting and enables reduction in costs.

2. Description of the Prior Art

A toroidal core type actuator is designed so that rotating shaft operates in repetitive rotary motions. While the repetitive rotary motions are within range of 180° (±90°), it is desired to produce constant torques in the range of the operational angle. In other words, the actuator is required for characteristics that the torques produced have no angle dependence at identical currents. With this view, so-called toroidal core type actuator constitution is typically employed in which wires are wound in coils about the circumference of a hollow cylindrical core to prepare a stator and a rotor comprising a permanent magnet is rotatably arranged in the hollow cylindrical core via a minute air gap.

However, since the hollow cylindrical core is used as the winding core when winding the coils about the circumference thereof, a special winding machine is naturally required for the toroidal core type actuator. This not only causes complication of the winding process, but also produces a drawback that collapse of the convolutions of the coils, and terminal handling after winding, positioning of the stator and the rotor after winding, fixing thereof and the like become problems to hamper stable constitution of the stator unit with excellent working properties.

Moreover, since the hollow cylindrical core requires a constant permeance (reciprocal of reluctance) along the circumferential direction, high dimensional accuracies are needed of the core. On this account, the stator is constituted by machining a block material, or by punching flat rolled soft magnetic steel strips having insulated surfaces into a disc shaped one under a press and then laminating the same in an axial direction. The machining, while securing high dimensional accuracies, produces a problem in increasing work costs. The lamination method requires expensive molds, and has problems in caulking accuracies and the like. Thus, there has been needed a stator structure which can be constituted at lower costs.

SUMMARY OF THE INVENTION

In view of the foregoing, an object of the present invention is to provide a toroidal core type actuator having a stator unit which is increased in winding density, is improved in terminal handling after winding, positioning of the stator after winding, and fixing of the same, and is excellent in working properties.

To achieve the foregoing object, the present invention provides a toroidal core type actuator comprising a stator and a rotor, the stator having winding in coils applied to a hollow cylindrical core composed of soft magnetic material, the rotor comprising a permanent magnet having N poles and S poles alternately arranged in total of m in the circumferential direction thereof, the rotor being rotatably arranged in the core of the stator via a minute air gap, wherein: m of phase separators composed of non-magnetic material are arranged on the peripheral surface of the hollow cylindrical core so as to be separated from each other by 360°/m; and the winding is applied to winding regions separated from each other by the phase separators.

The phase separators are preferably composed of insulating resin.

It is preferable that the m of phase separators arranged on the hollow cylindrical core are identical to each other in dimension at the radial innermost portions thereof, and the dimension is set to be smaller than the radial innermost dimension of the coils wound on the core.

It is also preferable that the m of phase separators arranged on the hollow cylindrical core are identical to each other in dimension at the outermost radial portions thereof, and that the dimension is set to be greater than the outermost radial dimension of the coils wound on the core.

Besides, it is preferable that the phase separators are integrally provided with an insulating portion for electrical insulation between the core and the winding.

Moreover, it is also preferable that at least one of the phase separators is provided with one or more coil binding terminal(s).

The core is preferably constituted by rolling a soft magnetic thin strip of uniform width into a roll shape.

The soft magnetic thin strip of roll shape preferably has a tapered portion sequentially and successively increasing its width from the innermost peripheral end thereof at the start of the roll.

The tapered portion is preferably extended for approximately one turn along the innermost periphery of the core.

Furthermore, it is preferable that the hollow cylindrical core is constituted by preparing pipe-shaped soft magnetic material as a rolling core, and winding thereon the soft magnetic thin strip of uniform width into a roll shape.

The nature, principle and utility of the invention will become more apparent from the following detailed description when read in conjunction with the accompanying drawings

DETAILED DESCRIPTION OF THE PREFERRED EMBODIMENTS

The embodiment of the present invention will now be described.

First of all, the principle of a toroidal core type actuator will be described with reference to FIGS. 1A and 1B.

Figure 1A:
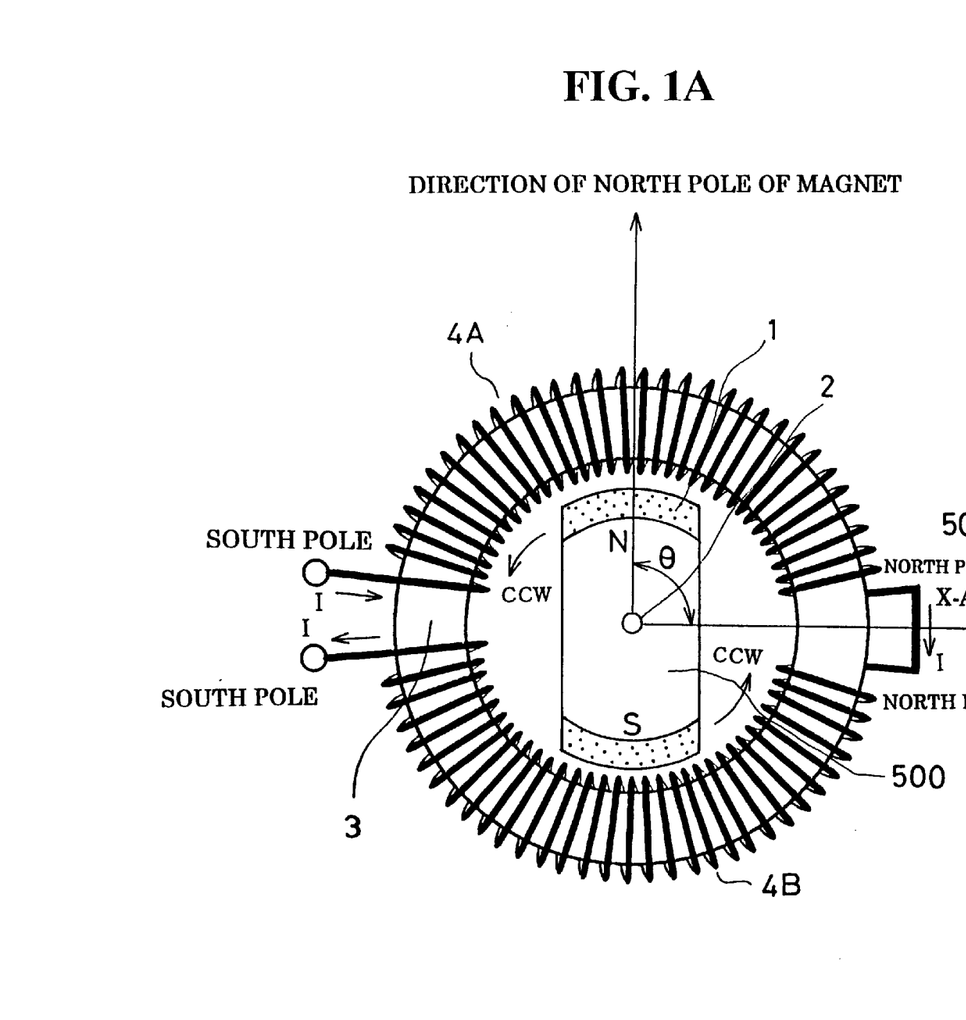
FIG. 1A is a front view of the constitution of a toroidal core type actuator.
Figure 1B:
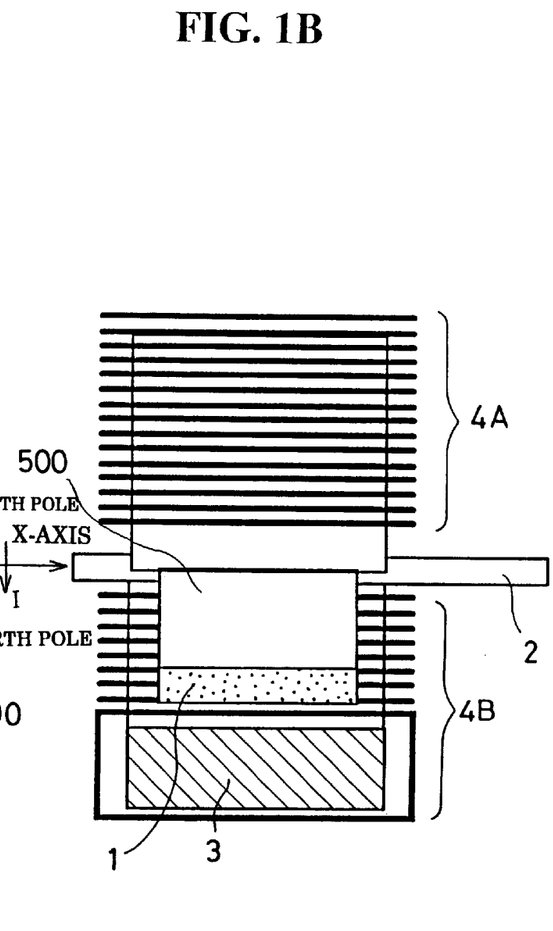
FIG. 1B is a partially sectional side view of the same.

FIG. 1A shows a front view of the actuator for explaining the principle, and FIG. 1B shows a partially sectional side view of the same actuator. In the example as shown, the actuator has two magnetic poles and two phase separators, and the coil is of a single layer.

The actuator is constructed as follows. The rotor unit is composed of a magnet 1 and a rotating shaft 2 which is rotatably fixed by bearings (not shown). The stator unit is constituted by applying an electric insulating treatment to a core 3 which serves as the winding core of a coil, and then winding a coil 4 about the same, in a single layer in the embodiment as shown. The coil 4 consists of an upper coil (A-phase coil) 4A and a lower coil (B-phase coil) 4B which are connected in series.

The principle of operation will be described below.

On the assumption here that a direct current is caused to flow through the coil 4 in the direction of an arrow in FIG. 1A, the A-phase coil 4A is excited so that the starting end thereof (the left end in FIG. 1A) becomes a south pole and the terminating end thereof (the right end in FIG. 1A) becomes a north pole. Meanwhile, the B-phase coil 4B is also excited to be a north pole at the starting end thereof (the right end in FIG. 1A) and a south pole at the terminating end thereof (the left end in FIG. 1A). As a result, a south pole of the rotor magnet 1 is attracted to the right ends (north poles) of the coils while a north pole of the rotor magnet 1 is attracted to the left ends (south poles) of the coils, resulting in generation of a torque in the direction of the arrow CCW (counterclockwise). When the direction of the current flowing through the coils 4A and 4B is inverted, the coils naturally form magnetic poles in inverted direction, so that the rotor magnet 1 produces a clockwise (CW) torque. Note that the rotor magnet 1 with its poles vertical as shown in FIG. 1A produces the maximum torque, and the magnet with the poles horizontal (when rotated rightwards or leftwards by 90° from the state of FIG. 1A) results in zero torque. Now, assuming that the direction of the north poles of the coils, excited as shown in FIG. 1A, is the X-axis and the angle formed between the X-axis and the direction of the north pole of the rotor magnet is θ (θ=90°, in the state of FIG. 1A), a counterclockwise torque is produced with θ in the range of 0° and 180°, while a clockwise torque is produced with θ in the range of 180° and 360°. Note that no torque is produced at θ of 0° and 180° as described above.

Figure 2:
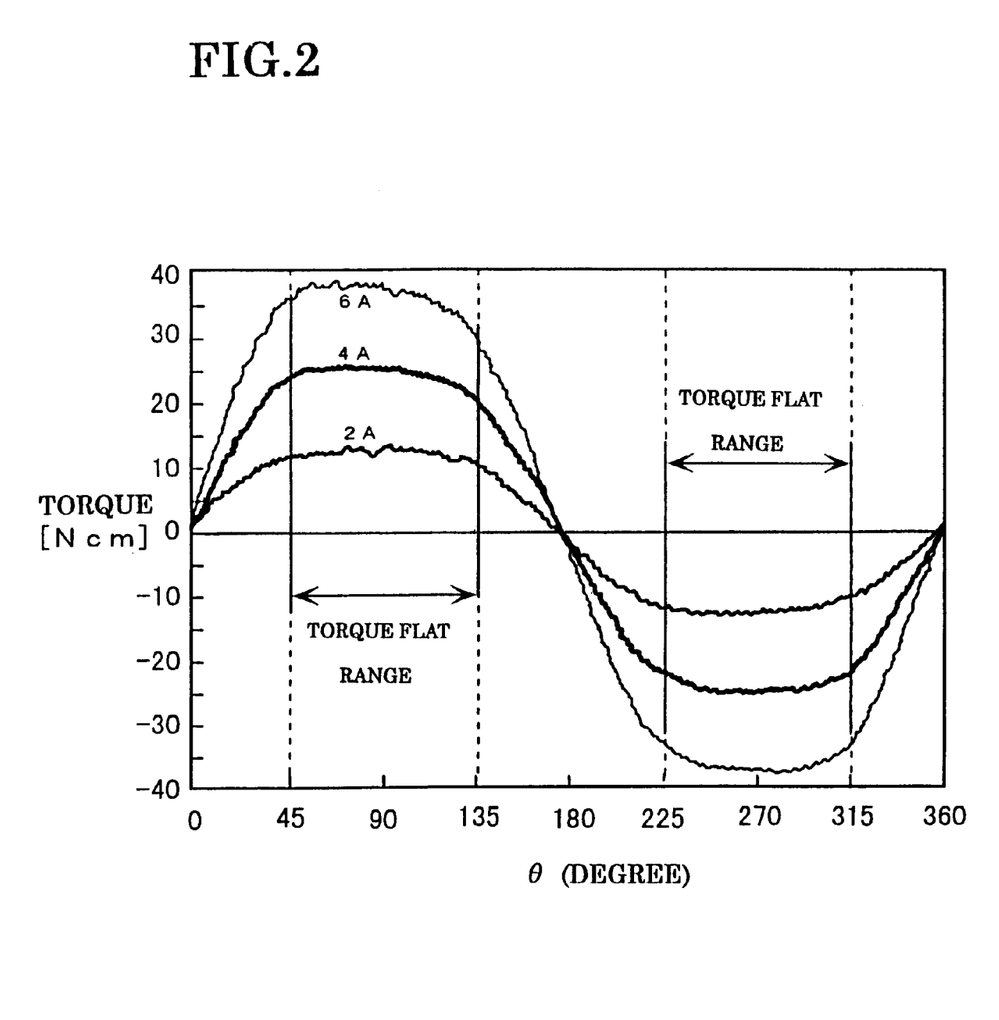
FIG. 2 shows the angle-torque characteristics of the toroidal core type actuator.

FIG. 2 shows an example of angle-torque characteristics of an actuator. The illustrated example is the characteristics of an actuator with the poles of m of the rotor are two and under currents of 2A, 4A and 6A. It will be seen in the drawing that flat ranges of torque extend over approximately 90° which means possibility of 90° operational angles for opening/closing. It is also seen that the torques increase in direct proportion to the input current values.

Next, referring to FIG. 3, description will be given of phase separators which are important elements in the present invention.

Figure 3:
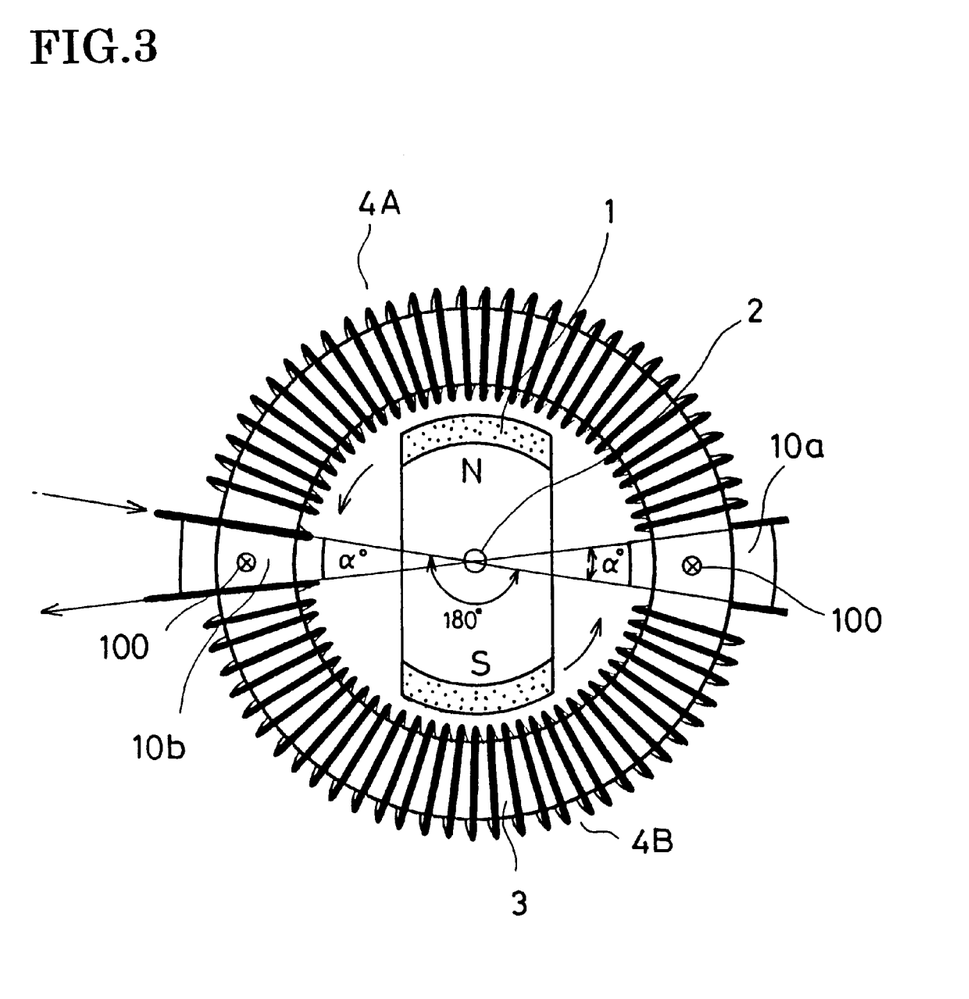
FIG. 3 is a front view of a first embodiment of the toroidal core type actuator according to the present invention.

FIG. 3 shows a front view of the actuator having two phase separators described in FIGS. 1A and 1B. The phase separators 10a and 10b are arranged at two positions (the same number as the number of poles of the rotor magnet), i.e., at the starting portion and the terminating portion of the coils which are positioned separately in a physical relationship of 180° in the present embodiment. These phase separators 10a and 10b have the effect of serving as a bank in starting/terminating of the coils, thereby offering the feature of preventing the coils from the collapse of convolutions of the coils and of allowing the winding at a constant and high winding density as well. Such effect is remarkable since the winding actually is needed for a plurality of layers (to be described by reference to FIG. 12) in order to improve the characteristics of the actuator. Smaller central angle a for the phase separators 10a, 10b is characteristically advantageous providing broader spaces for winding which permits multi-winding, and the present embodiment employs the angle α of 10° for the central angle. Angle α of some 10° can secure sufficient winding spaces while being effective for prevention of the convolution collapse of the coils.

In this connection, the phase separator 10a, 10b may be different in central angle α between the internal radial portion and the external radial portion thereof. In such cases in the present invention, the maximum angle between portions practically forming a bank is to be considered as the central angle α. The number of the phase separators 10a, 10b should be the same as m of the number of poles of the rotor magnet. This is because the actuator requires stator coils of the same number of phases as the number m of poles of the rotor magnet, and the same number of phase separators are necessary to equally arrange such number of coils onto the core 3. The phase separators 10a and 10b need to be non-magnetic for such reasons that the phase separators, if made of magnetic materials, disturb uniformity of the circumferential reluctance to preclude broader torque flat ranges. Designated by 100 are non-magnetic screws for fixing the phase separators 10a and 10b to the core 3. Note that the fixing between the phase separators 10a, 10b and the core 3 is not limited to such fixing by means of screws.

Figure 4:
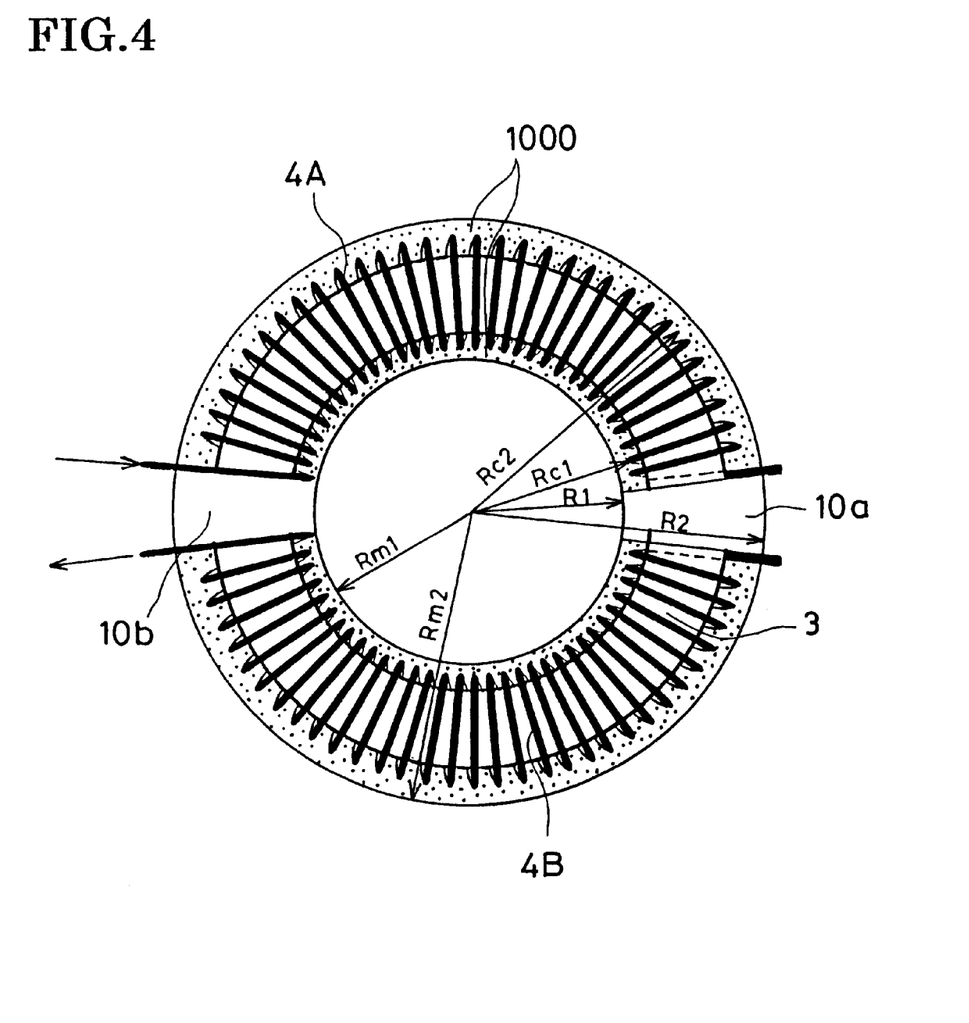
FIG. 4 is a front view of a second embodiment of the toroidal core type actuator according to the present invention.

FIG. 4 shows a second embodiment in which the stator unit in the embodiment of FIG. 3 is integrally molded with resin. When a stator unit after winding is fabricated by molding with resin 1000 as shown in FIG. 4 with a mold which is machined with the innermost radius R1 and the outermost radius R2 of the phase separators 10a, 10b as standards, the internal/external radii of the stator unit can be precisely secured to required dimensions. In particular, it is recommended that the coil 4, which is not always constant in dimension after being wound, be set in innermost radius Rc1 and outermost radius Rc2 as determined by the following equation (1) using the innermost radius R1 and the outermost radius R2 of the phase separators 10a and 10b:

$$R1=Rm1 \leq Rc1 \text{ and } R2=Rm2 \geq Rc2. \tag{1}$$

wherein Rm1 is the internal radial dimension and Rm2 is the external radial dimension after finishing the resin molding. FIG. 4 shows an example with R1=Rm1 and R2=Rm2; however, the coil at the inner periphery of the core is completely sealed with the resin if Rm1≦Rc1 is secured, and the coil at the outer periphery of the core can be completely sealed with resin if Rm2≧Rc2 is secured. As a result, a stator whose coil is constant in dimension after being wound can be provided with standard sizes for fabrication/assembling. Besides, positioning dowels, assembling flanges or the like may be provided integrally on the resin portions of the stator after the resin molding (including the phase separators 10a, 10b) to achieve a stator requiring yet less care after its fabrication. Moreover, stoppers for braking the rotation of the rotating shaft 2 may be formed integrally.

Figure 5:
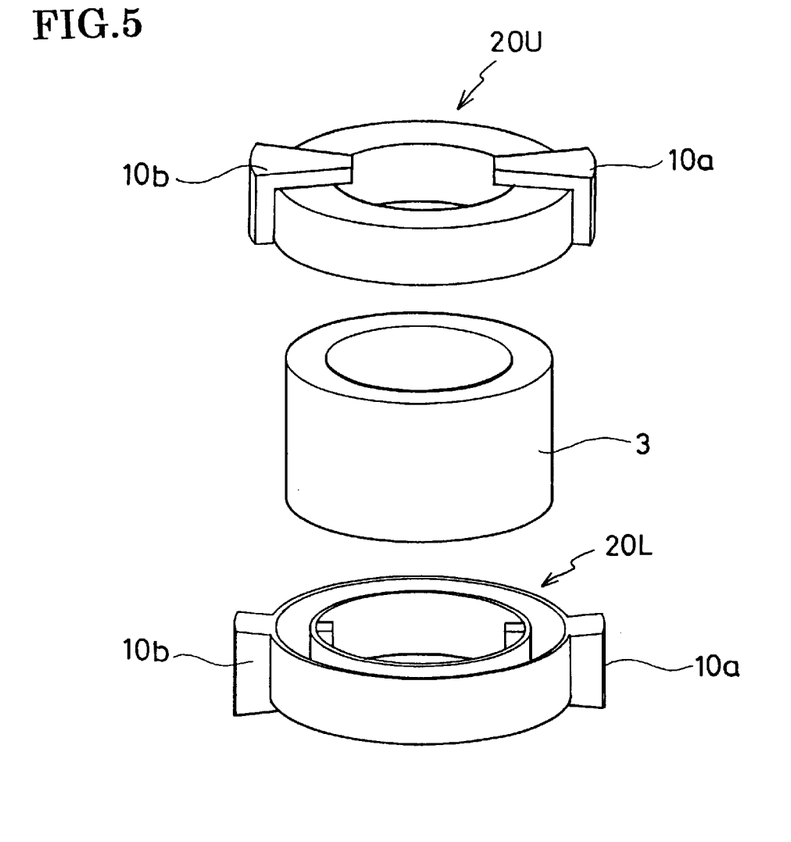
FIG. 5 is an exploded perspective view of a stator unit of the toroidal core type actuator according to the present invention.

FIG. 5 shows a third embodiment of the stator unit of the toroidal core type actuator according to the present invention.

This embodiment is an example of so-called integral type phase separators, in which phase separators and coil insulating material are integrated. When the stator is fabricated so that a core 3 is sandwiched from above and below with the phase separators 20U and 20L thus integrated, it becomes possible to wind wires without applying any insulating treatment to the core 3. While in the present embodiment the shapes of the integral type phase separators 20U and 20L are identical, they may be different from each other depending on the arrangement of the terminal portions.

Figure 6:
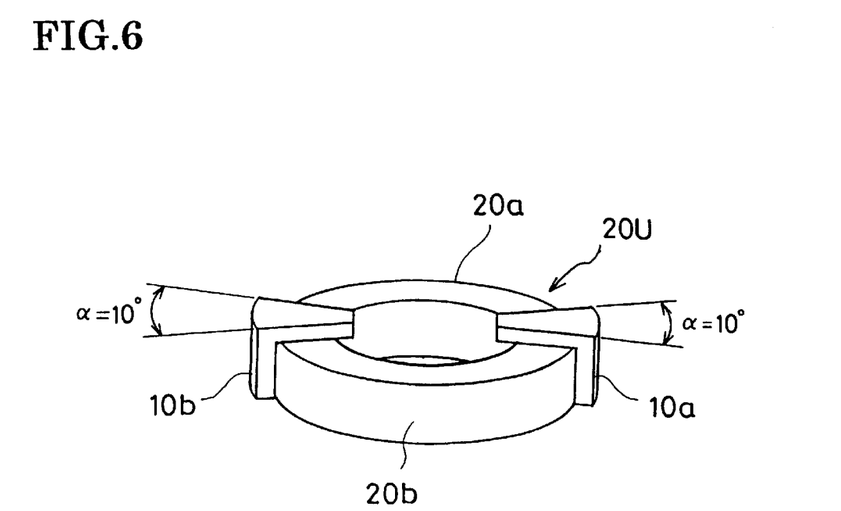
FIG. 6 is a perspective view of a phase separator used in the stator unit shown in FIG. 5.

FIG. 6 shows the upper phase separator 20U of the integral type phase separators of the toroidal core type actuator shown in FIG. 5. Designated by 10a and 10b are portions corresponding to phase separators. In other words, illustrated here is an example with two phase separators. As in FIG. 3, the phase separators 10a and 10b have the same shape with the central angle α of 10°. Winding is applied to regions 20a and 20b between the phase separators 10a and 10b. It is preferable that the regions 20a and 20b are formed as thin as possible (preferably 0.5 mm or less in thickness) to restrain increases in wire resistance.

Figure 7:
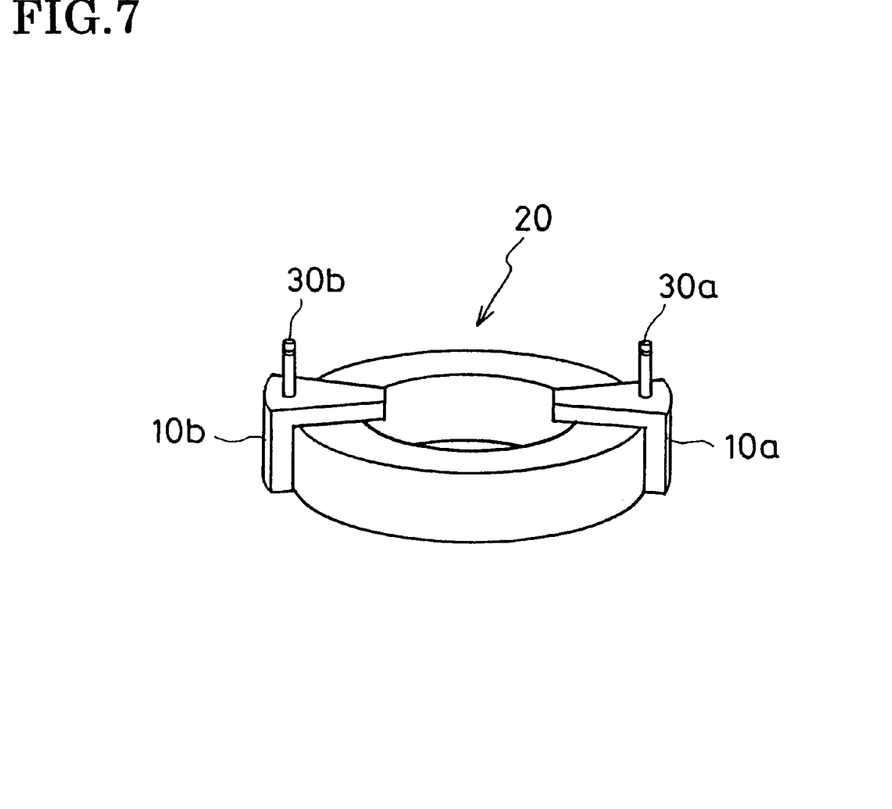
FIG. 7 is a perspective view showing an example of the phase separator in the stator unit of the toroidal core type actuator according to the present invention.
Figure 8:
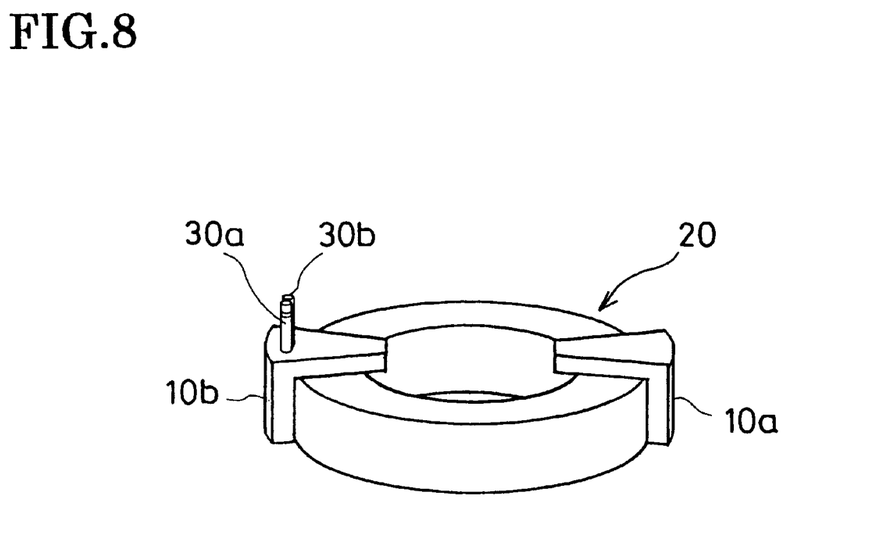
FIG. 8 is a perspective view showing another example of the phase separator in the stator unit of the toroidal core type actuator according to the present invention.

FIGS. 7 and 8 show further examples of the integral type phase separator, in which coil binding terminals 30a and 30b are implanted in phase separating portions. Of these, FIG. 7 illustrates the case where the phase separator 10a, 10b are provided with the coil binding terminals 30a and 30b, respectively. As shown in FIG. 8, both the coil binding terminals 30a and 30b may be provided on one phase separating portion 10b to arrange the terminals collectively on one side. In either case, the starting terminal and the ending terminal of the coil can be bound on the coil binding terminals 30a, 30b to eliminate the collapse of the convolutions of the coils, thereby allowing the production of a stator requiring little care thereafter.

FIGS. 9A, 9B, 9C, 10A, 10B, 10C, 11A, and 11B show fourth, fifth, and sixth embodiments on the fabrication method of the core 3 in the toroidal core type actuator according to the present invention.

In FIG. 5, the core 3 is shaped into the cylindrical shape by machining. This fabrication method, while securing the accuracy of the core, inevitably increases the costs. Thus, in the fabrication methods of FIGS. 9A, 9B, 9C and of FIGS. 10A, 10B, 10C, a soft magnetic thin strip being insulated at the surfaces is rolled into a roll shape to form the core 3. In the fabrication method of FIGS. 11A and 11B, a pipe material 60 is prepared as a rolling core, and a soft magnetic thin strip 61 with the insulated surfaces is wound thereon to form the core 3.

Figure 9A:
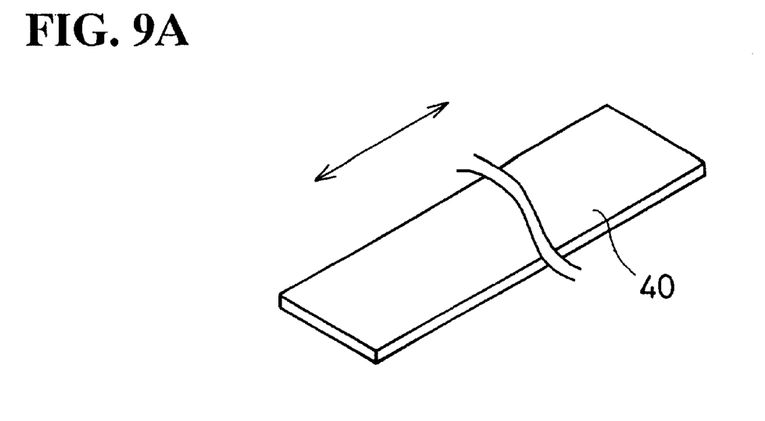
FIGS. 9A, 9B, and 9C show in sequence an example of the method for fabricating a core in the stator unit of the toroidal core type actuator according to the present invention.
Figure 9B:
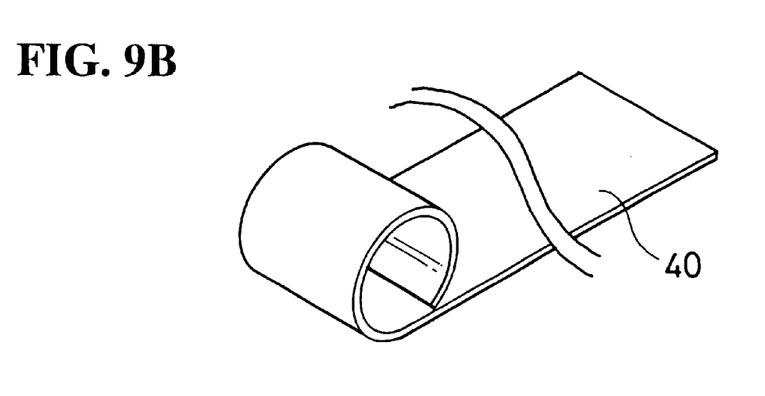
Figure 9C:
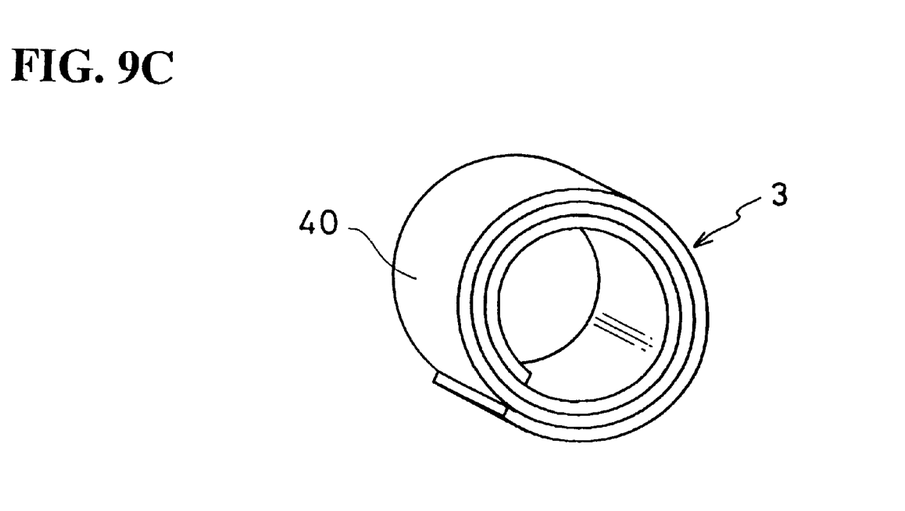

FIG. 9A shows an uniform-width thin strip 40 of soft magnetic material insulated on the surfaces, FIG. 9B the thin strip 40 on starting the rolling, and FIG. 9C the completed core 3 after rolling. The soft magnetic thin strip 40 typically employs a flat rolled soft magnetic steel sheet of 0.35 or 0.5 mm in thickness. Incidentally, in the cases where the thin strip has magnetic anisotropy, it is preferable in view of magnetic properties that the easy axis of magnetization is put along the longitudinal direction of the thin strip.

Figure 10A:
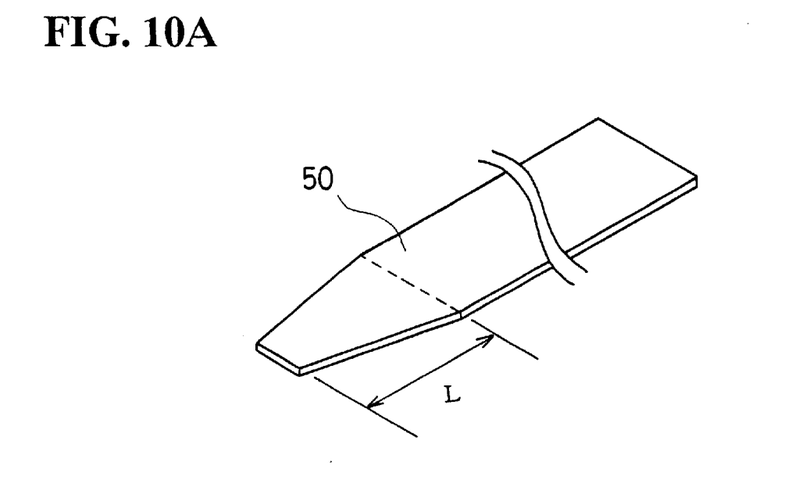
FIGS. 10A, 10B, and 10C show another example of the method for fabricating a core in the stator unit of the toroidal core type actuator according to the present invention.
Figure 10B:
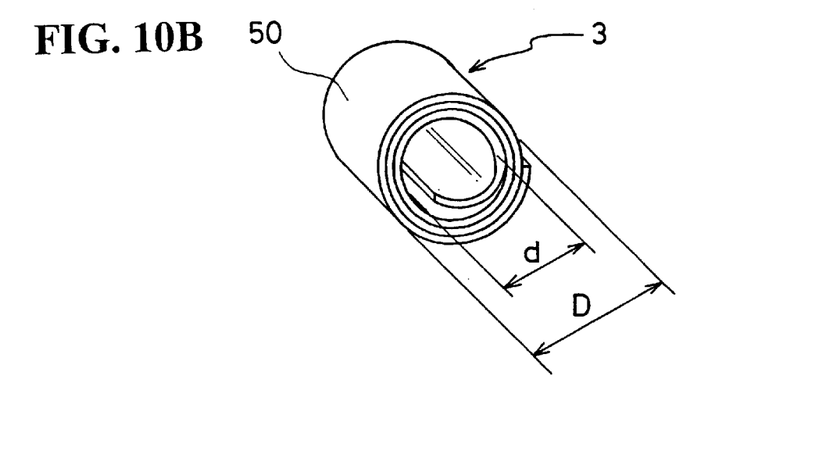
Figure 10C:
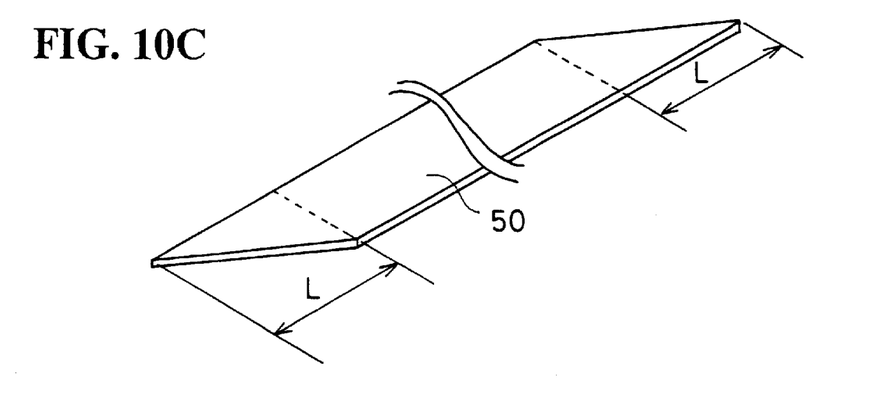

FIGS. 10A and 10C show cores employing thin strips as in FIGS. 9A to 9C, with a difference from the embodiment of FIGS. 9A to 9C in that the thin strip 50 of FIG. 10A is tapered at its front end (the starting end of the rolling) and the thin strip 50 of FIG. 10C is tapered at both the front end and tail end thereof in the same cultrate shape. FIG. 10B shows the completed core 3 being fabricated by rolling up the thin strip 50 of FIG. 10A or FIG. 10C.

While in FIGS. 9A to 9C the circumferential permeance greatly changes at the start of the roll inevitably producing cogging torques/torque ripples, the application of tapering to the front end and/or the tail end of the thin strip 50 as shown in FIGS. 10A and 10c can make gentle the change in the circumferential permeance to suppress the production of cogging torques/torque ripples. In view of the suppression of the cogging torques/torque ripples, the length L of the tapered portion of the thin strip 50 is preferably as long as possible. There is, however, a drawback that the equivalent air gap length increases with the length L to deteriorate the torque properties.

In FIGS. 10A and 10C, the length L of the tapered portion is set to be πd (d is an internal diameter of the completed core, as shown in FIG. 10B) so that only the innermost turn of the rolled core 3 is constituted by the tapered portion. This makes it possible to minimize the generation of the cogging torques/torque ripples and the deterioration of torque properties. Besides, in the example of FIG. 10C, the thin strip 50 has the cultrate tapered portions of the same shape formed at the start and the end of the roll, presenting additional advantage that the material can be cut in size without incurring waste.

Figure 11A:
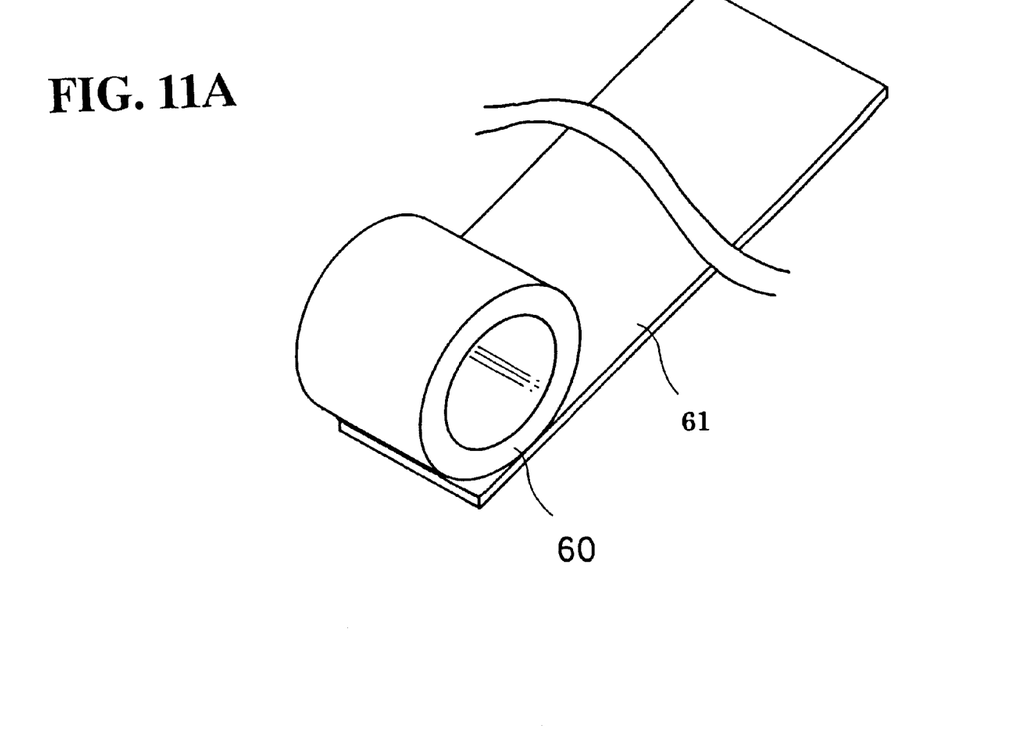
FIGS. 11A and 11B show still another example of the method for fabricating a core in the stator unit of the toroidal core type actuator according to the present invention.
Figure 11B:
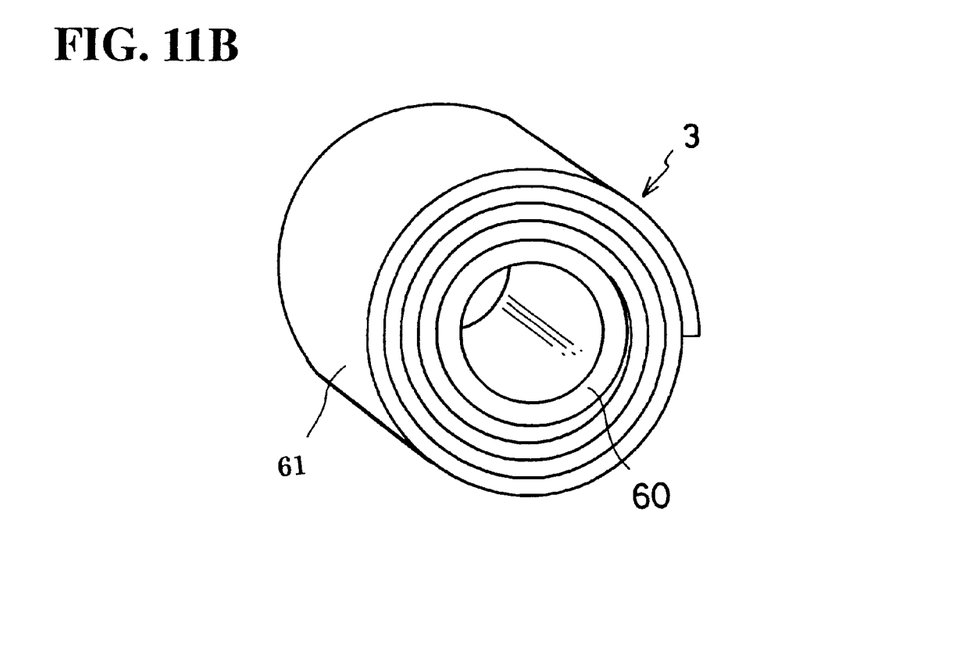

FIGS. 11A and 11B shows the sixth embodiment illustrating yet another method for fabricating the core 3. In this embodiment, the pipe material 60 is prepared as a rolling core, and the soft magnetic material 61 with the insulated surfaces is wound thereon to fabricate the core 3. FIG. 11A illustrates the start of the winding, and FIG. 11B illustrates the completed core after the winding. While the pipe material 60 is preferably large in thickness in order to serve as a rolling core and reduce the change in permeance across the starting portion of the thin strip roll, experimental results show that a thickness three to four times the thickness of the thin strip 61 is preferable. In the present embodiment, when the pipe material 60 was provided to be 1.0 t in thickness relative to the thin strip 61 of 0.3 t in thickness, a cogging torque of 1.35 Ncm was produced. The cogging torque of such level causes substantially no problem since the cogging torque of 1.15 Ncm (approximately 17% improvement) was produced in using a cut core.

Figure 12:
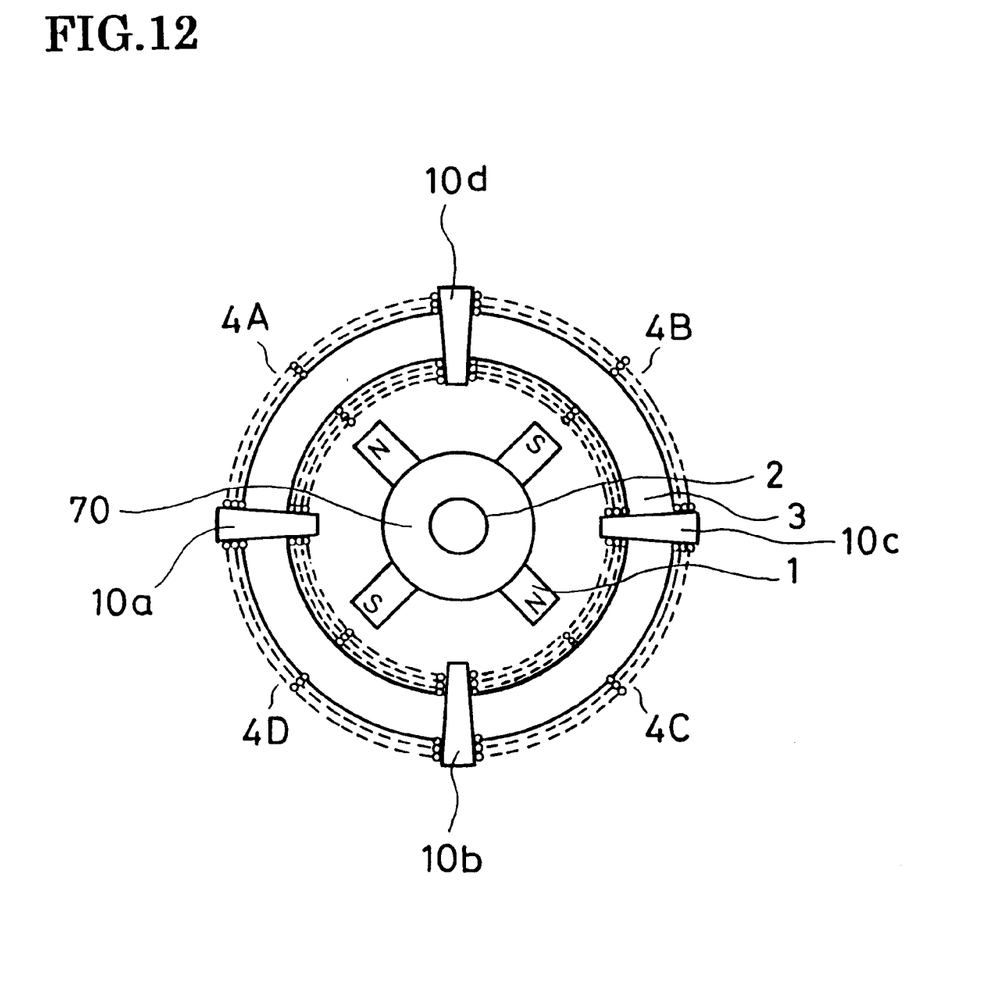
FIG. 12 is a front view of another embodiment of the toroidal core type actuator according to the present invention.

In the above embodiments, descriptions have been made on actuators in which the poles of m of the rotor magnet are two and the number of layers of the coil is one. FIG. 12 shows a seventh embodiment of an actuator in which the poles of m of the rotor magnet are four and the number of layers of the coil is three. In the embodiment, the stator coil 4 comprises four coils that is A-phase coil 4A, B-phase coil 4B, C-phase coil 4C and D-phase coil 4D connected in series. Component parts identical to those in FIGS. 1A and 1B will be designated by the same reference numerals, and parts having no direct relation to the following description will be omitted.

Since the poles of m of the rotor are four, the number of phase separators 10 is four. Besides, in order to improve the torque properties, the coils are provided in three layers. Therefore, the convolutions of the coils may become larger in height, increasing the possibility of the collapse of convolutions. However, when the phase separators 10a, 10b, 10c, and 10d are adequately set in length as shown, they can properly serve as banks against the end portions of the coils to avoid the collapse of convolutions, making it possible to stably wind coils at a constant density even in the cases of the multilayered coils. Incidentally, designated by 70 is a rotor core. The rotor core 70 is a ring composed of soft magnetic material, constituting a part of the magnetic circuit of the rotor magnet.

Imaginably, also in the embodiment of FIG. 12, the resin molding may be applied to the stator unit with the phase separators as the dimensional standards. The phase separators may be provided with coil binding terminals as in the embodiments of FIGS. 7 and 8. Moreover, the core may be constituted by a roll of soft magnetic thin strip. Furthermore, there is no reason in the present invention to limit the number of layers of the coil to one or three.

According to the present invention, it is possible in a toroidal core type actuator to increase the space factor of coils and facilitate the winding as well by separating the coils from each other using the phase separators. Besides, improvements are made to the methods of the terminal handling after the winding, the positioning of the stator to the rotor after the winding, and the fixing thereof. Therefore, a stator unit requiring little care after its fabrication can be constituted. In particular, the internal radial dimension and the external radial dimension of the stator, which are important dimensions in actuators, can be set at constant values with a high degree of accuracy by molding. Furthermore, a core can be formed by rolling a thin strip to provide a cylindrical core at lower costs. As a result, the effect is obtained that a toroidal core type actuator with small iron loss can be constituted at lower costs.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A toroidal core type actuator, having two phase separators, comprising a stator and a rotor, said stator having a winding wound on an insulating portion made of a non-magnetic resin applied to a hollow cylindrical core comprising a soft magnetic material, said rotor including a permanent magnet having a north pole and a south pole positioned along the circumferential direction thereof and being rotatably arranged in said core of said stator via a minute air gap, wherein the number of said phase separators is equal to the number of said poles;

said two phase separators comprise a non-magnetic insulating material and are arranged on a peripheral surface of said hollow cylindrical core so as to be separated from each other by approximately 180°; and said winding is wound on winding regions separated from each other by said phase separators.

2. The toroidal core type actuator according to claim 1, wherein at least one of said phase separators is provided with one or more coil binding terminals.

3. The toroidal core type actuator according to claim 1, wherein said phase separators arranged on said peripheral surface of said hollow cylindrical core are identical to each other in dimension at radial innermost portions thereof and said dimension is set to be smaller than a radial innermost dimension of the winding wound on said insulating portion.

4. The toroidal core type actuator according to claim 3, wherein said phase separators arranged on said peripheral surface of said hollow cylindrical core are identical to each other in dimension at outermost radial portions thereof and said dimension is set to be greater than an outermost radial dimension of the winding wound on said insulating portion.

5. A toroidal core type actuator comprising a stator and a rotor, said stator having winding applied to a hollow cylindrical core composed of soft magnetic material, constituted by rolling a soft magnetic thin strip of uniform width into a roll shape, said rotor including a permanent magnet having north poles and south poles alternately arranged in total of m along the circumferential direction thereof and being rotatable arranged in said core of said stator via a minute air gap, wherein m of phase separators composed of non-magnetic material are arranged on a peripheral surface of said hollow cylindrical core so as to be separated from each other by 360°/m;

a coil is wound on winding regions separated from each other by said phase separators; and wherein said soft magnetic thin strip of roll shape has a tapered portion sequentially and successively increasing its width from an innermost peripheral end thereof at a start of the roll.

6. The toroidal core type actuator according to claim 5, wherein said tapered portion extends for approximately one turn along the innermost periphery of said core.

7. The toroidal core type actuator according to claim 6, wherein said hollow cylindrical core is constituted by preparing pipe-shaped soft magnetic material as a rolling core, and winding on said rolling core said soft magnetic thin strip of uniform width into a roll shape.

8. A toroidal core type actuator comprising a stator and a rotor, said stator having a winding wound on an insulating portion made of a non-magnetic resin applied to a hollow cylindrical core comprising a soft magnetic material, said rotor including a permanent magnet having north poles and south poles alternately positioned along the circumferential direction thereof and being rotatably arranged in said core of said stator via a minute air gap, at least two phase separators, comprising a non-magnetic material, arranged on a peripheral surface of said hollow cylindrical core, wherein said at least two phase separators are equal in number to the number of said poles;

wherein said at least two phase separators are somewhat wedge-shaped and converge at a maximum angle α towards the center of said rotor; and said winding is wound on winding regions separated from each other by said phase separators.

* * * * *